(12) United States Patent
Abbaspour et al.

(10) Patent No.: US 12,374,219 B2
(45) Date of Patent: Jul. 29, 2025

(54) INTELLIGENT DETECTION OF EMERGENCY VEHICLES

(71) Applicant: TUSIMPLE, INC., San Diego, CA (US)

(72) Inventors: Ali Reza Abbaspour, San Diego, CA (US); Navid Sarmadnia, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 168 days.

(21) Appl. No.: 18/303,683

(22) Filed: Apr. 20, 2023

(65) Prior Publication Data

US 2023/0343214 A1    Oct. 26, 2023

Related U.S. Application Data

(60) Provisional application No. 63/363,387, filed on Apr. 21, 2022.

(51) Int. Cl.
*G08G 1/00*      (2006.01)
*B60W 60/00*   (2020.01)
(Continued)

(52) U.S. Cl.
CPC ... *G08G 1/096725* (2013.01); *B60W 60/0027* (2020.02); *G06F 18/2415* (2023.01);
(Continued)

(58) Field of Classification Search
CPC ....... G08G 1/096725; G08G 1/096791; G08G 1/0965; G08G 1/096775; B60W 60/0027;
(Continued)

(56) References Cited

U.S. PATENT DOCUMENTS 9,092,977 B1 *  7/2015  Levandowski  ...... G08G 1/0965
9,278,689 B1 *  3/2016  Delp  .................... G08G 1/0965
(Continued)

FOREIGN PATENT DOCUMENTS

EP           4280193 A1 *  11/2023  ........... G08G 1/0965
IN     201821049794 A      12/2018
(Continued)

OTHER PUBLICATIONS

Hongyi Sun, Xinyi Liu, Kecheng Xu, Jinghao Miao, Qi Luo "Emergency Vehicles Audio Detection and Localization in Autonomous Driving", [Submitted on Sep. 30, 2021 (v1), last revised Oct. 2, 2021 (6 pages).
(Continued)

*Primary Examiner* — Peter D Nolan
*Assistant Examiner* — Peter Y Ning
(74) *Attorney, Agent, or Firm* — Perkins Coie LLP (57) ABSTRACT

An autonomous vehicle detects an approaching emergency vehicle by performing a plurality of types of analysis of signals output by sensors in the vehicle. Each type of analysis generates a different prediction that indicates a likelihood of a proximity of an emergency vehicle to the autonomous vehicle. The predictions are processed and fused to generate a determination that indicates whether an emergency vehicle is proximate to the autonomous vehicle. In response to the determination indicating the emergency vehicle is proximate, the autonomous vehicle performs an action.

21 Claims, 4 Drawing Sheets

(51) Int. Cl.
*G06F 18/2415* (2023.01)
*G08G 1/0967* (2006.01)

(52) U.S. Cl.
CPC ... *G08G 1/096791* (2013.01); *B60W 2420/40* (2013.01); *B60W 2420/54* (2013.01); *B60W 2554/402* (2020.02); *B60W 2554/4046* (2020.02); *B60W 2556/65* (2020.02)

(58) Field of Classification Search
CPC ......... B60W 2420/40; B60W 2420/54; B60W 2554/402; B60W 2554/4046; B60W 2556/65; G06F 18/2415
See application file for complete search history.

(56) References Cited

U.S. PATENT DOCUMENTS

| | | | | |
|---|---|---|---|---|
| 2017/0030725 | A1* | 2/2017 | Gordon | B60W 50/14 |
| 2018/0137756 | A1* | 5/2018 | Moosaei | G08G 1/09675 |
| 2018/0233047 | A1* | 8/2018 | Mandeville-Clarke | B60W 30/00 |
| 2019/0039613 | A1* | 2/2019 | Lee | G08G 1/167 |
| 2019/0066498 | A1* | 2/2019 | Baldwin | B60W 10/20 |
| 2020/0276973 | A1* | 9/2020 | Meijburg | G08G 1/096816 |
| 2021/0074152 | A1* | 3/2021 | Floyd | G08G 1/0965 |
| 2021/0201676 | A1* | 7/2021 | Tariq | B60W 30/18163 |
| 2022/0394674 | A1* | 12/2022 | Chen | H04W 72/0446 |
| 2022/0410937 | A1* | 12/2022 | Parasuram | G05D 1/0214 |
| 2023/0056551 | A1* | 2/2023 | Christensen | G08G 1/0965 |
| 2023/0245558 | A1* | 8/2023 | Monegan | H04W 4/90 |
| 2023/0341854 | A1* | 10/2023 | Lennie | G05D 1/0088 |
| 2023/0398985 | A1* | 12/2023 | Lashkari | G08G 1/167 |
| 2024/0010231 | A1* | 1/2024 | Han | G01C 21/3415 |

FOREIGN PATENT DOCUMENTS

| | | |
|---|---|---|
| WO | 2020041443 A1 | 2/2020 |
| WO | 2021080989 A1 | 4/2021 |
| WO | 2021138259 A1 | 7/2021 |

OTHER PUBLICATIONS

European Patent Office, Extended European Search Report for EP Appl. No. 23169319.3, mailed on Sep. 14, 2023, 9 pages.

* cited by examiner

INTELLIGENT DETECTION OF EMERGENCY VEHICLES

CROSS-REFERENCE TO RELATED APPLICATIONS

This patent document claims priority to and the benefit of U.S. patent application Ser. No. 63/363,387, filed on Apr. 21, 2022, for which the disclosure is incorporated by reference in its entirety.

BACKGROUND

Any vehicle operating on a public road has a duty to watch for and yield to emergency vehicles. For autonomous vehicles, accurate and timely detection of emergency vehicles is important to enable the autonomous vehicles to observe applicable traffic laws. However, it can be difficult for autonomous vehicles to detect emergency vehicles and determine whether an action such as yielding should be taken.

BRIEF DESCRIPTION OF THE DRAWINGS

Embodiments or implementations describing aspects of the invention are illustrated by way of example, and the same references can indicate similar elements.

DETAILED DESCRIPTION

During operation, an autonomous vehicle may encounter a situation in which an emergency vehicle such as a fire truck, a police car or an ambulance may be nearby, In such situations, the autonomous vehicle is expected to follow local rules and regulations regarding allowing the emergency vehicle to proceed without obstructions. Furthermore, in such situations, the autonomous vehicle may need to also anticipate sudden lane changes or stoppages by other surrounding vehicles in order to make room for the emergency vehicle to proceed.

The present document discloses various solutions to enable such a behavior by an autonomous vehicle. For example, according to some embodiments, an autonomous vehicle detects an emergency vehicle in its environment using a combination of data sources. In some implementations, an autonomous vehicle processes a signal received from a sensor in the vehicle. As a result of the processing, the vehicle outputs a prediction indicating a likelihood that an emergency vehicle is present in an environment proximate to the autonomous vehicle. A vehicle-to-vehicle communication message from another vehicle is received, which contains a notification of an approaching emergency vehicle. Based on the output prediction and the vehicle-to-vehicle communication message, the autonomous vehicle generates a determination that indicates whether an emergency vehicle is proximate to the autonomous vehicle. In response to the determination indicating the emergency vehicle is proximate, the autonomous vehicle performs an action.

In some implementations, a non-transitory computer readable storage medium stores instructions that cause one or more processors to obtain computer vision data captured by sensors associated with one or more vehicles during operation of the one or more vehicles. A model is trained using the computer vision data. When trained, the model is configured to receive real-time computer vision data indicative of an environment of an autonomous vehicle and output a classification of a behavior of traffic in the environment as either indicative of a presence of an emergency vehicle or not indicative of a presence of an emergency vehicle. During operation of a target vehicle, classifications output by the trained model and predictions indicating a likelihood that an emergency vehicle is present can be received, where the predictions are generated by the target vehicle based on processing of a signal received from a sensor in the target vehicle. The model can be retrained based on a difference between the classifications output by the model and the predictions generated by the target vehicle.

In some implementations, an autonomous vehicle includes a plurality of sensors configured to measure parameters of an environment around the autonomous vehicle. Instructions stored in a computer readable storage medium are executed by one or more processors to cause the one or more processors to perform a plurality of types of analysis of signals output by the plurality of sensors. Each type of the analysis generates a prediction that indicates a likelihood of a proximity of an emergency vehicle to the autonomous vehicle based on one or more of the signals. The generated predictions are processed to generate a determination that indicates whether an emergency vehicle is proximate to the autonomous vehicle. In response to the determination indicating the emergency vehicle is proximate, the autonomous vehicle is caused to perform an action.

The present application will be further described in detail with reference to the drawings and embodiments. It will be appreciated that the specific embodiments described herein are merely illustrative of the present application and are not to be construed as limiting the present application. In addition, the embodiments and features thereof in the present application may be combined with one another without conflict. It should be further noted that, for the convenience of description, only some, but not all, structures associated with the present application are shown in the drawings.

It should be noted that, before discussing exemplary embodiments in greater detail, some exemplary embodiments are described as processes or methods depicted as flowcharts. Although a flowchart describes steps as sequential processes, many of the steps can be implemented in parallel, concurrently, or simultaneously. In addition, the sequence of the steps can be rearranged. The processes can be terminated when operations thereof are completed, however, additional steps not included in the figure can be comprised herein. The processes can correspond to methods, functions, procedures, subroutines, subprograms, and the like.

It should be noted that the terms "first", "second", and the like in the embodiments of the present application are only used for distinguishing between different apparatuses, modules, units, or other objects, and are not used for limiting the sequence of the functions performed by these apparatuses, modules, units, or other objects, or the interdependence of these apparatuses, modules, units, or other objects.

Figure 1:
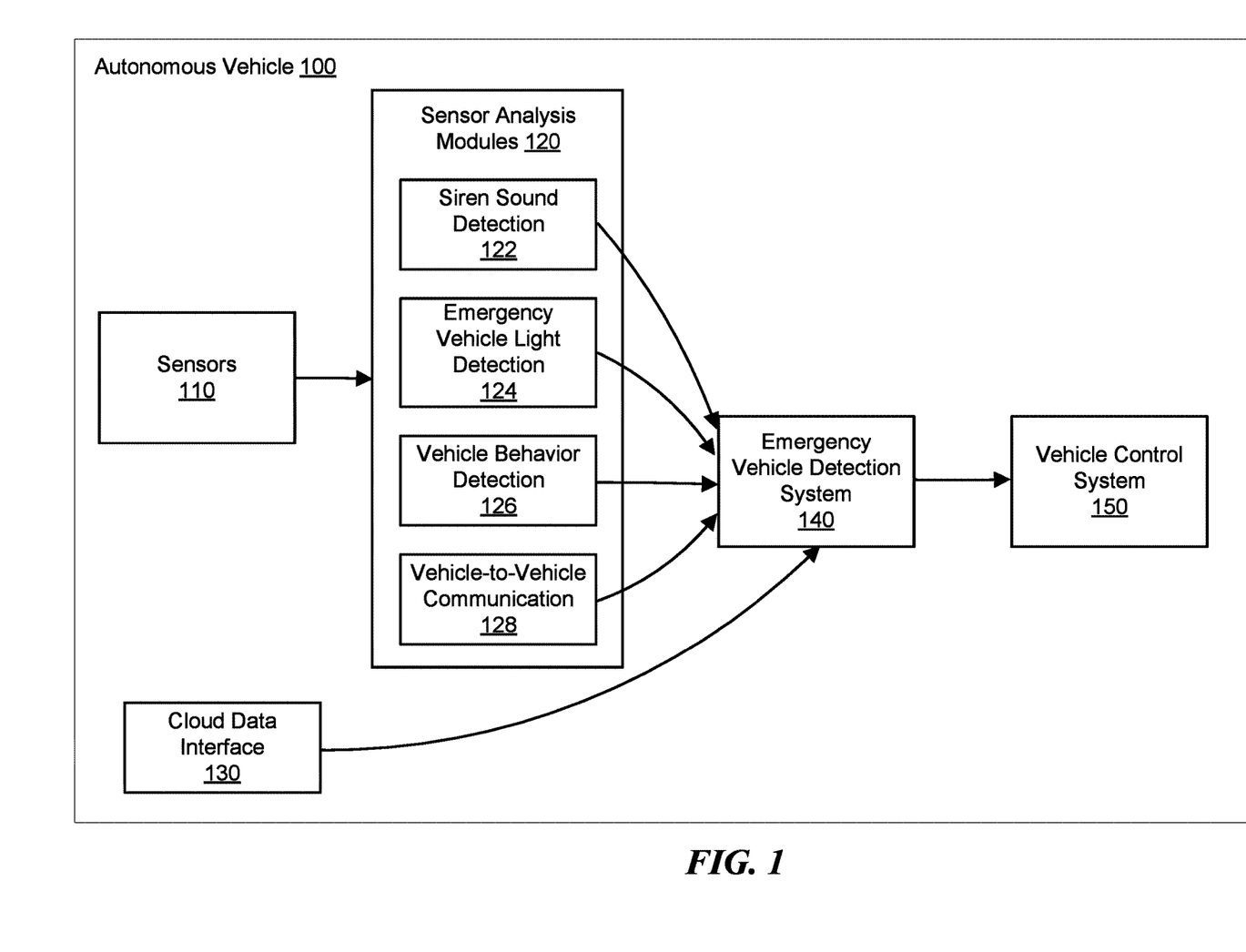
FIG. 1 is a block diagram illustrating components of an autonomous vehicle, according to some implementations.

FIG. 1 is a block diagram illustrating components of an autonomous vehicle 100, according to some implementations. As shown in FIG. 1, the autonomous vehicle 100 includes a set of sensors 110, one or more sensor analysis modules 120, a cloud data interface 130, an emergency vehicle detection system 140, and a vehicle control system 150. The emergency vehicle detection system 140 can receive inputs from one or more of the sensor analysis module 120, such as a siren sound detection module 122, an emergency vehicle light detection module 124, a vehicle behavior detection module 126, a vehicle-to-vehicle communication module 128, and/or the cloud data interface 130.

The autonomous vehicle 100 includes a set of sensors 110, which includes one or more sensors that measure a parameter of an environment around the vehicle 100. The sensors 110 can include, for example, one or more sound input sensors such as a microphone, and one or more perception sensors such as a camera, a radar system, or a lidar system.

The siren sound detection module 122 processes sound data, for example received from a sensor, e.g., a microphone in the vehicle 100, to determine if the sound data matches expected characteristics of an emergency vehicle's siren. In one example, when the siren sound detection module 122 classifies a sound as likely matching the characteristics of a siren, the siren sound detection module 122 outputs a signal indicating possible detection of an emergency vehicle.

The emergency vehicle light detection module 124 processes computer vision data, such as data received from one or more perception sensors in the vehicle 100, to determine if lights detected in an environment of the vehicle match expected characteristics of an emergency vehicle's lights. In one example, when the emergency vehicle light detection module 124 classifies lights as likely matching the characteristics of emergency vehicle lights, the emergency vehicle light detection module 124 outputs a signal indicating possible detection of an emergency vehicle.

The vehicle behavior detection module 126 processes computer vision data received from perception sensors to determine if behaviors of other vehicles in the environment of the autonomous vehicle 100 indicate that the other vehicles are reacting to an approaching emergency vehicle. In one example, when the vehicle behavior detection module 126 detects behaviors that indicate the other vehicles are reacting to an emergency vehicle, the vehicle behavior detection module 126 outputs a signal indicating possible detection of an emergency vehicle.

The vehicle-to-vehicle communication module 128 receives messages from other vehicles via a direct communication channel between the vehicles. Vehicles can communicate with each other via any of a variety of communication protocols, including cellular-based protocols, WiFi-based protocols, or radio frequency-based protocols. For example, the autonomous vehicle 100 communicates with other vehicles using protocols such as cellular vehicle-to-everything (CV2X) or dedicated short-range communications (DSRC). Using these direct communications, vehicles can share information about road conditions, traffic conditions, or the presence of an emergency vehicle. In one example, the vehicle-to-vehicle communication module 128 receives a message from another vehicle indicating that an emergency vehicle is approaching, the vehicle-to-vehicle communication module 128 outputs a signal indicating possible detection of an emergency vehicle.

The cloud data interface 130 communicates with a remote data source, such as a server, a cloud-based application, or a cloud storage device. Information about the environment of the autonomous vehicle 100 can be pushed to the vehicle via the cloud data interface 130 and/or pulled by the cloud data interface 130. For example, a remote data source can send information to the cloud data interface 130 about a current position or path of an emergency vehicle. Communications between the cloud data interface 130 and the remote data source can be enabled by any of a variety of communications protocols, such as cellular- or WiFi-based protocols. The remote data source may be a remote control center that includes a remote control operator (i.e., a human operator) who may determine which data to send to the autonomous vehicle 100.

In some implementations, the cloud data interface 130 can also receive updates to models employed by various modules or systems of the vehicle 100, such as siren processing models used by the siren sound detection module 122, computer vision models used by the emergency vehicle light detection module 124 or the vehicle behavior detection module 128, or emergency vehicle detection models used by the emergency vehicle detection module 140. The cloud data interface 130 can also send data collected by the modules or systems of the autonomous vehicle 100 to a remote system for improving the various models. Alternatively or additionally, data sent by the autonomous vehicle 100 to the remote system may be relayed to other autonomous vehicles in a fleet, as deemed necessary the remote system or by an operator at the remote system.

The emergency vehicle detection system 140 receives inputs from the sensor analysis modules 120 and determines whether an emergency vehicle is nearby based on signals output by the modules. In some implementations, the emergency vehicle detection system 140 outputs a determination that indicates whether an emergency vehicle is proximate to the autonomous vehicle. This determination indicating whether an emergency vehicle is proximate to the autonomous vehicle can be based on one or more analysis modules 120. In one example, the emergency vehicle detection system 140 outputs a determination based on the output from vehicle-to-vehicle communication module 128 only. In another example, the emergency vehicle detection system 140 outputs a determination based only on the output from vehicle behavior detection module 126. In yet another example, the emergency vehicle detection system 140 outputs a determination based on the output from vehicle-to-vehicle communication module 128 and outputs from the emergency vehicle light detection module 124. The emergency vehicle detection system 140 can output more detailed information about the emergency vehicle in addition to or instead of the determination. For example, some implementations of the emergency vehicle detection system 140 output a classification of the emergency vehicle (e.g., as a police car, a firetruck, or an ambulance), a distance between the emergency vehicle and the autonomous vehicle, or a predicted trajectory of the emergency vehicle (e.g., whether the emergency vehicle is approaching from behind, in front of, or a side of the autonomous vehicle 100).

The vehicle control system 150 controls aspects of operation of the autonomous vehicle 100. When the emergency vehicle detection system 140 outputs the determination indicating an emergency vehicle is proximate, the vehicle control system 150 causes the vehicle to perform an action. For example, the vehicle control system 150 causes the vehicle 100 to slow or pull to a side of the road to allow the emergency vehicle to pass. As another example, in implementations where the vehicle 100 is not operated fully autonomously, the vehicle control system 150 can output an alert to a driver of the vehicle to navigate the vehicle to the side of the road or away from the path of the emergency vehicle.

Figure 2:
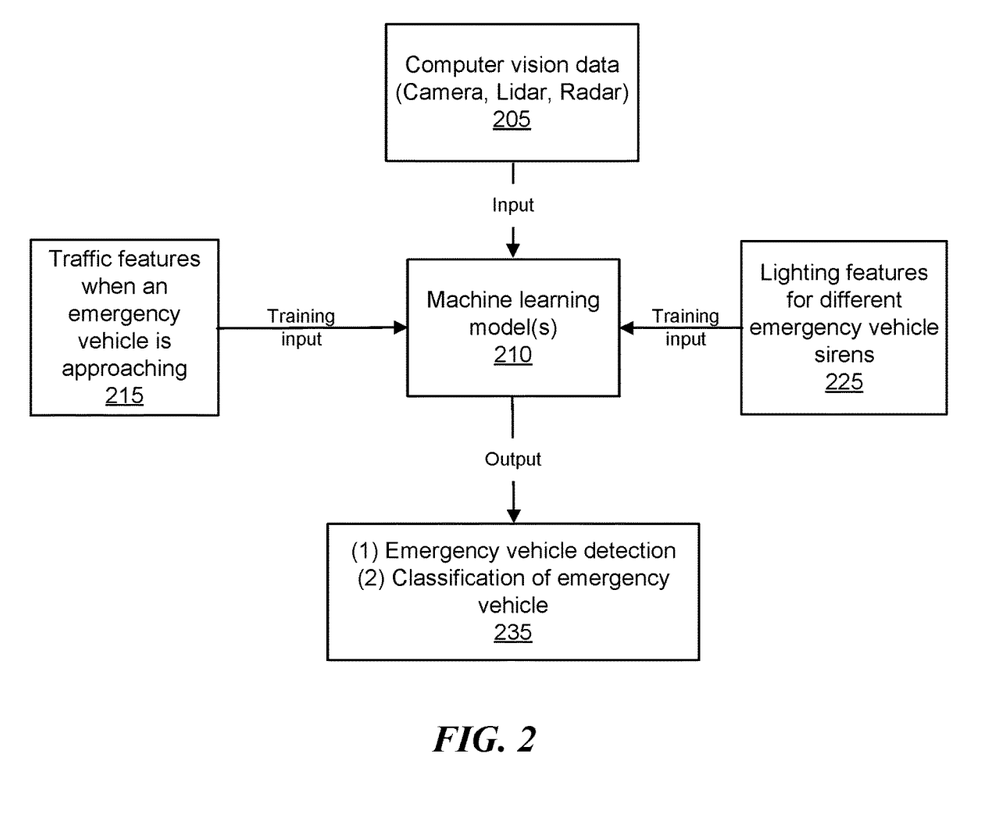
FIG. 2 illustrates an example machine learning model configured to detect a presence of an emergency vehicle based on patterns of traffic behavior around an autonomous vehicle, according to some implementations.

FIG. 2 illustrates an example machine learning model 210 configured to detect a presence of an emergency vehicle based on patterns of traffic behavior around an autonomous vehicle.

The machine learning model 210 can be trained using traffic features 215 and/or lighting features 225 (e.g., characteristics or traits of emergency vehicle lights such as flashing frequency, colors, and the like) of emergency vehicles. A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an emergency vehicle approaching based on an analysis of a large set of traffic data that includes traffic behaviors indicative of and not indicative of the presence of an emergency vehicle. Examples of models include: neural networks, support vector machines, decision trees, Parzen windows, Bayes clustering, reinforcement learning, probability distributions, decision trees, decision tree forests, and others. Models can be configured for various situations, data types, sources, and output formats.

In some implementations, the machine learning models 120 can include a neural network with multiple input nodes that receive an input data point or signal, such as a signal received from a computer vision system associated with the vehicle 100. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer ("the output layer"), one or more nodes can produce a value classifying the input that, once the model is trained, can be used to cause an output in the vehicle 100. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes inputs and desired outputs. The inputs can include, for example, the traffic features 215 and/or lighting features 225 of emergency vehicles. Example outputs used for training can include an indication of whether an emergency vehicle was present at the time the training inputs were collected, a classification of a type of the emergency vehicle that was present, or a trajectory of an emergency vehicle. The desired output (e.g., an indication that an emergency vehicle is present or an indication that an emergency vehicle is not present) can be provided to the model. Output from the model can be compared to the desired output for the corresponding inputs and, based on the comparison, the model can be modified, such as by changing weights between nodes of the neural network or parameters of the functions used at each node in the neural network (e.g., applying a loss function). After applying each of the data points in the training data and modifying the model in this manner, the model can be trained to evaluate new data points (such as the computer vision data 205) to generate the outputs 225.

The machine learning model 210 can be trained to identify patterns of traffic behavior that are likely to indicate the presence of an emergency vehicle. Different models can be trained to recognize behaviors that apply to different types of roads or that comply with applicable traffic laws in different jurisdictions. For example, the model 210 can detect behaviors such as the vehicles behind the autonomous vehicle 100 pulling towards a right side of the road and stopping to allow another vehicle to pass.

Some implementations of the machine learning model 210 can further be trained to identify a direction from which an emergency vehicle is approaching, based on the patterns of traffic behavior. Still further implementations of the machine learning model 210 are trained to classify a type of approaching emergency vehicle, based for example on the shape or size of the approaching vehicle, light patterns, or sound features of the vehicle's siren.

Once trained, the machine learning model 210 is configured to receive computer vision data 205 as an input and generate a corresponding output 235. Some implementations of the machine learning model 210 output a message or alert when an emergency vehicle is detected based on the input computer vision data. The output can further include an estimate at a trajectory of the emergency vehicle relative to the autonomous vehicle 100, as well as the classification of the type of emergency vehicle.

The machine learning model 210 can continuously process real-time computer vision data while the vehicle is operated. As the data is captured, it can be input to the machine learning model to detect or classify traffic behaviors as either being indicative of or not indicative of a presence of an emergency vehicle, or to classify the direction an emergency vehicle is traveling based on the traffic behaviors. In other implementations, the machine learning model 210 can detect or classify types of vehicle lights as being indicative of or not indicative of a presence of an emergency vehicle, or detect or classify these lights as indicating a particular type of emergency vehicle that is approaching.

When an emergency vehicle has been detected, its type classified, or its trajectory determined based on application of the machine learning model 210, the autonomous vehicle 100 can transmit information to other vehicles via a vehicle-to-vehicle message or can upload the information to a remote data source.

Figure 3:
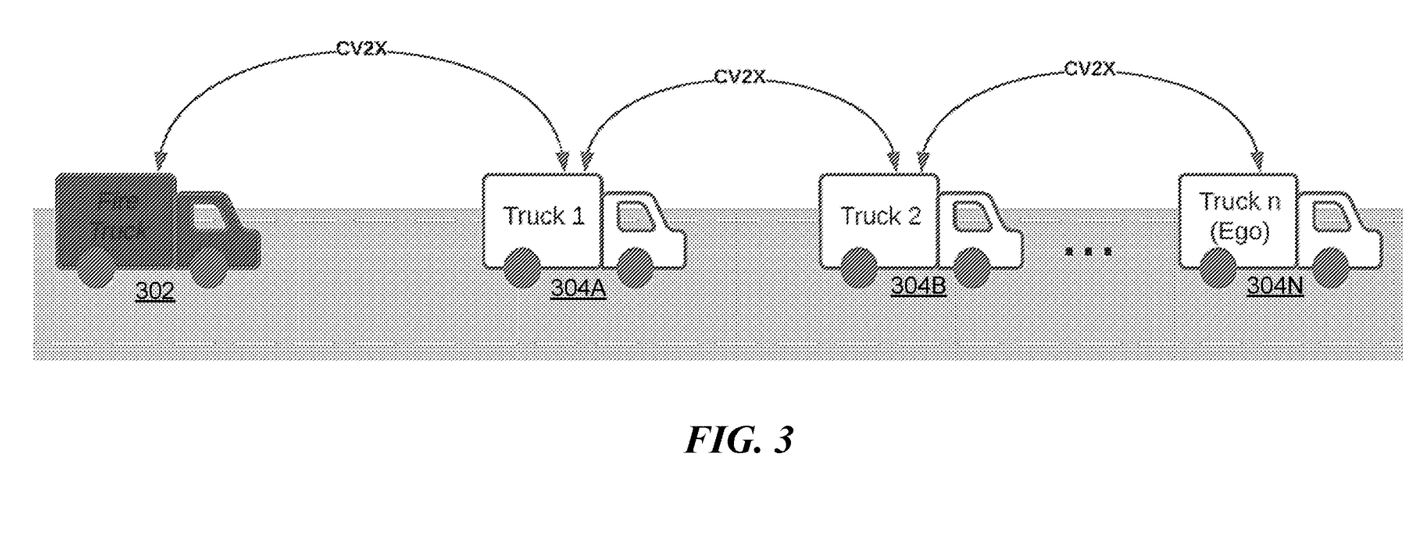
FIG. 3 illustrates an example of vehicle-to-vehicle communication.

FIG. 3 illustrates an example use of vehicle-to-vehicle communication, such as CV2X, to share information about emergency vehicles between vehicles on a road. As shown in FIG. 3, vehicles such as trucks 304 can share information with each other via CV2X messages. Emergency vehicles such as a fire truck 302 can also exchange CV2X messages with other vehicles on the road. In one example, the fire truck 302 broadcasts a message indicating its presence and/or trajectory to nearby vehicles, such as the first truck 304A. The first truck 304A in turn broadcasts a message to pass on the information from the fire truck 302 to the second truck 304B, until the autonomous vehicle 304N receives the message. In another example, the trucks 304 can generate the initial message indicating the presence and/or trajectory of the fire truck 302. If the truck 304A detects the emergency vehicle, based for example on any of the processes described herein, the truck can generate and transmit a CV2X message to other surrounding vehicles to notify them of the detected emergency vehicle. A vehicle can additionally or alternatively transmit the message to other vehicles in response to explicit input from an occupant of the vehicle to identify or confirm the presence of the emergency vehicle.

Figure 4:
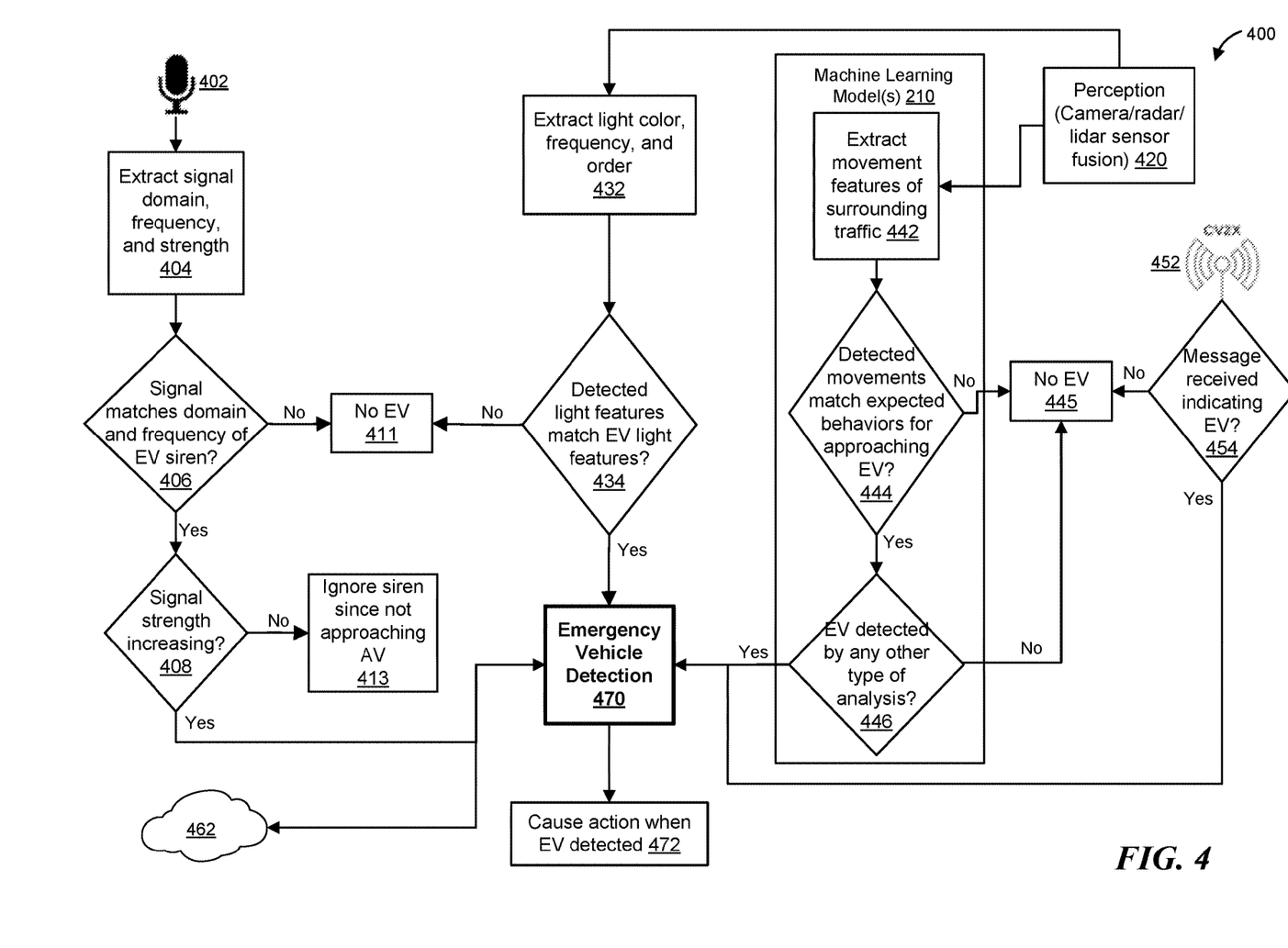
FIG. 4 is a flowchart illustrating a process for detecting emergency vehicles.

FIG. 4 is a flowchart illustrating a process 400 for detecting emergency vehicles. The process 400 detects emergency vehicles using a combination of different types of analysis of sensor signals, where each type of analysis uses a different feature associated with the arrival of an emergency vehicle to generate a prediction that indicates a likelihood that an emergency vehicle is proximate to the autonomous vehicle 100. The process 400 can be performed by the autonomous vehicle 100, for example by one or more processors in the vehicle executing computer program instructions. Other implementations of the process 400 can include additional, fewer, or different steps, and the steps can be performed concurrently or in different orders than shown.

At block 404, the vehicle 100 receives a sound signal from a microphone 402. The sound signal is processed to extract features such as signal domain, frequency, and strength of the signal.

At block 406, the vehicle 100 determines whether the features extracted from the sound signal match expected features of an emergency vehicle's siren. For example, the vehicle 100 determines if an average spectrum of the sound signal is within a threshold of an expected average spectrum for an emergency vehicle. In other implementations, the vehicle 100 performs audio fingerprinting analysis of the sound signal to determine if the sound signal matches an expected fingerprint of an emergency vehicle's siren.

If the features of the sound signal do not match expected features for a siren, the vehicle 100 determines that an emergency vehicle is not present at block 411. The vehicle can continue monitoring sound inputs received via the microphone 402 until a likely siren is detected.

If the features of the sound signal do match the expected siren features, the vehicle 100 determines at block 408 whether the strength of the signal is increasing. If the strength is either constant or decreasing, the vehicle 100 determines at block 413 that the emergency vehicle is not approaching the vehicle's location and thus can be ignored. However, if the strength is increasing, the autonomous vehicle 100 outputs an indication that an emergency vehicle has been detected. Alternatively, or additionally, when the audio signal has a constant volume it may be that an emergency vehicle is temporarily stopped due to traffic; in such cases, the autonomous vehicle 100 may evaluate audio the signal at a later time again to adjust its output accordingly. The output is processed at the emergency vehicle detection block 470, discussed below.

The vehicle 100 can also receive perception data from a computer vision system 420. The perception data can be used to detect lights of an emergency vehicle or detect traffic patterns that are likely to indicate the presence of an emergency vehicle.

At block 432, the vehicle 100 processes the perception data to extract lighting features such as light color, frequency, or order of lights detected by the computer vision system 420.

At block 434, the vehicle 100 determines whether the extracted light features match expected lighted features of an emergency vehicle. Since different types of emergency vehicles may have different lighting colors, frequencies, or patterns, the vehicle 100 can compare the extracted features to expected emergency vehicle lighting features for each of multiple different types of emergency vehicles. If the extracted light features match any of the types of emergency vehicle lights, the vehicle 100 can determine that the extracted light features indicate the presence of an emergency vehicle. Furthermore, the vehicle 100 can classify the type of emergency vehicle that is present based on the type of expected lights that is more closely matched by the extracted light features. Some implementations of the vehicle 100 use a trained machine learning model to analyze the extracted light features and classify the lights as likely originating from or not originating from an emergency vehicle.

If the extracted lighting features are determined to not match the expected lighting features of an emergency vehicle, the vehicle 100 can determine at block 411 that an emergency vehicle is not present. The vehicle can continue monitoring the perception data to detect and process additional lights.

In some implementations, the vehicle 100 can additionally or alternatively compare the lighting features to other types of lights that may be detected, such as lights on maintenance or construction vehicles, traffic control lights, etc. If the lighting features match expected features for any of the other, non-emergency lights, the vehicle 100 can determine that an emergency vehicle has not been detected at block 411.

If the extracted light features are determined to match the features of an emergency vehicle, the autonomous vehicle 100 outputs an indication that an emergency vehicle has been detected to the emergency vehicle detection block 470.

The perception data output by the computer vision system 420 can also be processed by one or more machine learning models 210. At block 442, the vehicle 100 applies the model 210 to the perception data to extract movement features of the surrounding traffic. At block 444, the vehicle 100 uses the model to determine whether the detected movement features match expected behaviors for an approaching emergency vehicle. For example, if traffic behind the vehicle 100 all starts moving to a side of the road, the vehicle 100 can determine that an emergency vehicle is likely approaching.

If the detected movements do not match expected behaviors for an approaching emergency vehicle, the vehicle 100 can determine that no emergency vehicle is approaching at block 445.

If the detected movements do match the expected behaviors for an approaching emergency vehicle, the vehicle 100 can output an indication that an emergency vehicle has ben detected to the emergency vehicle detection block 470.

In some implementations, the vehicle 100 further determines at block 446 if an emergency vehicle has been detected by any of the other types of analysis (that is, whether any of the other types of analysis generated a prediction that an emergency vehicle is likely approaching the autonomous vehicle). If another type of analysis predicted an emergency vehicle is likely approaching while the machine learning model predicted that the traffic behaviors were consistent with an emergency vehicle, the indication of the emergency vehicle can be output to the emergency vehicle detection block 470. On the other hand, if no other type of analysis predicted that an emergency vehicle is approaching, the machine learning model 210 can be retrained based on a difference between the traffic behavior classification output by the model and the predictions generated by the other types of analysis.

The vehicle 100 can further process vehicle-to-vehicle communications received via an interface such as an antenna 452. At block 454, the vehicle 100 determines whether a message has been received indicating that another vehicle has detected an approaching emergency vehicle. If no message has been received, the vehicle 100 determines no emergency vehicle is approaching at block 445. If a message is received, the vehicle 100 outputs an indication that an emergency vehicle has been detected to the emergency vehicle detection block 470.

Emergency vehicle notifications can further be received from a cloud data source 462. For example, other vehicles or the emergency vehicles themselves can upload information about the emergency vehicles' trajectories to the cloud data source 462. The autonomous vehicle 100 receives the uploaded information, for example as a notification that an emergency vehicle is approaching the location of the autonomous vehicle 100.

At the emergency vehicle detection block 470, the autonomous vehicle 100 generates a determination indicating whether an emergency vehicle is present based on the various received predictions generated by the analysis performed at blocks 408, 434, 444, 454, and/or the cloud data source 462. In some implementations, the autonomous vehicle outputs a determination that an emergency vehicle is present if a specified number of the predictions generated by the various types of emergency vehicle detection analyses indicate that an EV has been detected. For example, some implementations of the autonomous vehicle may not output the determination unless two or more of the analysis types predict the presence of an emergency vehicle, while other implementations output the determination if any one of the analysis types indicates detection of the EV. As another example, the autonomous vehicle outputs a determination that an emergency vehicle is present if a specific one of the types of analysis (e.g., receiving a CV2X message at block 454) outputs a prediction indicating the presence of an emergency vehicle, in combination with the output of any other types of analysis. Alternatively, the autonomous vehicle can require the prediction output by a particular one of the analysis types (e.g., the pathway including the machine learning model 210) to be corroborated by the prediction by another analysis type, but determines that an emergency vehicle is present if any other one of the predictions indicates detection of an emergency vehicle.

In other implementations, the autonomous vehicle applies a weighting function to the generated predictions. For example, each type of analysis outputs a binary score, such as a 1 if the analysis predicts an emergency vehicle is likely to be proximate and a 0 if the analysis predicts an emergency vehicle is unlikely to be proximate. Each of these scores is then multiplied by a weight; if a sum of the weighted scores exceeds a specified threshold, the vehicle 100 determines an emergency vehicle is present. The weights can be determined based on an expected accuracy of the various types of analysis when predicting whether an emergency vehicle is nearby. The weights can be the same across different autonomous vehicles, or can vary depending on the particular autonomous vehicle (e.g., to take into account sensor calibration or positioning on a particular vehicle), the particular type of emergency vehicle that is being detected, the direction from which the emergency vehicle is predicted to be approaching, or other variables.

At block 472, the autonomous vehicle 100 causes an action to be performed when the processing performed at block 470 indicates that an emergency vehicle is proximate to the autonomous vehicle. In some cases, the action by the vehicle 100 is an autonomous driving action performed to navigate the vehicle out of a path of the emergency vehicle. The vehicle 100 can be programmed to perform an action that is dependent on the local laws of the jurisdiction in which the vehicle operates, the type of road the vehicle is currently on, or other applicable factors. For example, the vehicle can navigate to a right side of the road and stop when an emergency vehicle has been detected to be approaching from behind. If an emergency vehicle is detected to be approaching from in front of the autonomous vehicle 100, the vehicle 100 may determine that it should pull to the right side of the road or take no action, depending on the road type.

The action performed by the vehicle 100 in response to detection of an emergency vehicle can include a variety of other actions in addition to or instead of the action to navigate the vehicle out of the path of the emergency vehicle. For example, the vehicle 100 can broadcast a notification of the presence of the emergency vehicle to other nearby vehicles via the vehicle-to-vehicle communications interface 452 or upload the notification to the cloud 462. In another example, the vehicle 100 outputs an alert to a driver of the vehicle to notify the driver that an appropriate action should be taken.

If the emergency vehicle is detected to be outside of a specified proximity to the autonomous vehicle 100, the vehicle may output a first action when the emergency vehicle is first detected and wait to take a second action until the emergency vehicle is within the proximity to the vehicle 100. For example, the first action may include outputting an alert to an occupant, transmitting a message to nearby vehicles, or moving to a lane closer to the side of the road while continuing to drive. Once the emergency vehicle is sufficiently close to the autonomous vehicle, the vehicle can take a second action of navigating to the side of the road and stopping to allow the emergency vehicle to pass.

It will be appreciated by one of skill in the art that the present document discloses various technical solutions to provide autonomous vehicle embodiments with the ability to handle emergency vehicle situations according to local rules and regulations and in a manner that is least disruptive to the emergency vehicles and other vehicles around the autonomous vehicle. In one advantageous aspect, multiple independently operating decision processes may be used to detect the presence of an autonomous vehicle. One such decision process may be based on signals received from one or more sensors which may be located on the vehicle or may be located outside the vehicle (e.g., emergency signal relay stations on the road-side). Another such decision process may be based on alerting messages received from other nearby vehicles using vehicle-to-vehicle communication that is a direct communication method that does not rely on any underlying infrastructure such as a wireless network. Put differently, even in locations where a cellular or network signal may not be present (e.g., tunnels or mountainous area), the vehicle-to-vehicle may still operate to provide such alerts to nearby vehicles (e.g., typically within <100 meters). It will further be appreciated that the use of multiple independent processes will increase reliability of detection of emergency vehicles. Furthermore, a person of skill in the art would appreciate that the use of a machine learning algorithm will provide the autonomous with an ever-optimizing process that learns from past encounters with emergency vehicles by the autonomous vehicle, or by other autonomous vehicles with whom there is communication.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A method comprising:
processing a signal received from a sensor associated with an autonomous vehicle, the processing outputting a prediction indicating a likelihood that an emergency vehicle is present in an environment proximate to the autonomous vehicle;
receiving, at the autonomous vehicle, a vehicle-to-vehicle communication message from another vehicle that contains a notification of an approaching emergency vehicle;
generating a determination, based on the output prediction and the vehicle-to-vehicle communication message, that indicates whether an emergency vehicle is proximate to the autonomous vehicle;
in response to the determination indicating the emergency vehicle is proximate, causing the autonomous vehicle to perform an action;
wherein processing the signal received from the sensor associated with the autonomous vehicle comprises:
determining if behaviors of other vehicles in the environment of the autonomous vehicle indicate that the other vehicles are reacting to an approaching emergency vehicle;
in response to detecting behaviors that indicate the other vehicles are reacting to the approaching emergency vehicle, outputting the prediction indicating the likelihood that the emergency vehicle is present in the environment.

2. The method of claim 1, further comprising:
receiving information from a remote computing device that indicates a path of an emergency vehicle;
wherein the determination indicating whether the emergency vehicle is proximate to the autonomous vehicle is further generated based on the information received from the remote computing device.

3. The method of claim 1, wherein processing the signal received from the sensor associated with the autonomous vehicle further comprises:
  determining that an emergency vehicle is likely approaching if traffic behind the autonomous vehicle all starts moving to a side of a road.

4. The method of claim 1, further comprising:
  training different machine learning models to recognize behaviors that apply to different types of roads or that comply with applicable traffic laws in different jurisdictions.

5. The method of claim 1, further comprising:
  comparing extracted lighting features with expected features of different types of emergency vehicles; and
  determining a type of the emergency vehicle that is proximate to the autonomous vehicle according to the comparing.

6. The method of claim 1, further comprising:
  determining, in response to extracted lighting features match other types of lights, no emergency vehicle has been detected;
  wherein the other types of lights comprises at least one of lights on maintenance vehicle, lights on construction vehicles, or traffic control lights.

7. The method of claim 1, wherein processing the signal received from the sensor associated with the autonomous vehicle further comprises:
  determining, in response to features of a sound signal received from a microphone in the autonomous vehicle matching expected siren features, whether a strength of the sound signal is increasing;
  outputting, in response to the strength being increasing, an indication that the emergency vehicle has been detected.

8. The method of claim 7, further comprising:
  in response to the strength being constant or decreasing, determining that the emergency vehicle is not approaching a location of the autonomous vehicle and ignoring the sound signal at this time.

9. A non-transitory computer readable storage medium storing executable instructions, the instructions when executed by one or more processors causing the one or more processors to:
  obtain computer vision data captured by sensors associated with one or more vehicles during operation of the one or more vehicles;
  train a model using the obtained computer vision data, the model when trained configured to receive real-time computer vision data indicative of an environment of an autonomous vehicle and output a classification of a behavior of traffic in the environment as either indicative of a presence of an emergency vehicle or not indicative of a presence of an emergency vehicle;
  receiving classifications output by the trained model during operation of a target vehicle and predictions indicating a likelihood that an emergency vehicle is proximate to the target vehicle, the predictions generated based on processing of a signal received from a sensor in the target vehicle; and
  retraining the model based on a difference between the classifications and the predictions;
  wherein the model when trained is further configured to:
  determine if behaviors of other vehicles in the environment of the autonomous vehicle indicate that the other vehicles are reacting to an approaching emergency vehicle;
  in response to detecting behaviors that indicate the other vehicles are reacting to the approaching emergency vehicle, output the prediction indicating the likelihood that the emergency vehicle is present in the environment proximate to the autonomous vehicle.

10. The non-transitory computer readable storage medium of claim 9, wherein the instructions further cause the one or more processors to:
  train a second model using the obtained computer vision data, the second model when trained configured to receive the real-time computer vision data indicative of the environment of the target vehicle and output a classification of vehicle lights detected in the environment as either indicative of a presence of an emergency vehicle or not indicative of a presence of an emergency vehicle.

11. The non-transitory computer readable storage medium of claim 10, wherein the second model when trained further outputs a classification of a type of the emergency vehicle.

12. The non-transitory computer readable storage medium of claim 9, wherein the instructions further cause the one or more processors to:
  train a third model using the obtained computer vision data, the third model when trained configured to receive the real-time computer vision data indicative of the environment of the target vehicle and output a classification of a direction an emergency vehicle is traveling relative to the target vehicle.

13. An autonomous vehicle, comprising:
  a plurality of sensors configured to measure parameters of an environment around the autonomous vehicle;
  one or more processors; and
  a non-transitory computer readable storage medium storing executable instructions, the instructions when executed by the one or more processors causing the one or more processors to:
    perform a plurality of types of analysis of signals output by the plurality of sensors, each type of analysis generating a prediction that indicates a likelihood of a proximity of an emergency vehicle to the autonomous vehicle based on one or more of the signals;
    process the generated predictions to generate a determination that indicates whether an emergency vehicle is proximate to the autonomous vehicle; and
    in response to the determination indicating the emergency vehicle is proximate, cause the autonomous vehicle to perform an action;
  wherein the instructions when executed by the one or more processors further causing the one or more processors to:
  determining if behaviors of other vehicles in the environment of the autonomous vehicle indicate that the other vehicles are reacting to an approaching emergency vehicle;
  in response to detecting behaviors that indicate the other vehicles are reacting to the approaching emergency vehicle, outputting the prediction indicating the likelihood that the emergency vehicle is present in the environment.

14. The autonomous vehicle of claim 13, wherein the instructions further cause the one or more processors to:
  receive information from a remote computing device that indicates a path of an emergency vehicle;
  wherein processing the generated predictions further comprises using the received information to generate the determination indicating whether the emergency vehicle is proximate to the autonomous vehicle.

15. The autonomous vehicle of claim 13, wherein the plurality of types of analysis comprise a siren sound detection analysis, and wherein performing the siren sound detection analysis comprises:
    extracting one or more features from a sound signal received from a microphone in the autonomous vehicle;
    comparing the extracted features to expected features of an emergency vehicle siren; and
    in response to identifying a match between the extracted features and the expected features of the emergency vehicle siren, outputting a prediction that the emergency vehicle is proximate to the autonomous vehicle.

16. The autonomous vehicle of claim 13, wherein the plurality of types of analysis comprise an emergency vehicle light detection analysis, and wherein performing the emergency vehicle light detection analysis comprises:
    extracting lighting features from a perception data signal received from a computer vision system in the autonomous vehicle;
    comparing the extracted lighting features to expected features of emergency vehicle lights; and
    in response to identifying a match between the extracted lighting features and the expected features of emergency vehicle lights, outputting a prediction that the emergency vehicle is proximate to the autonomous vehicle.

17. The autonomous vehicle of claim 13, wherein the plurality of types of analysis comprise a traffic behavior analysis, and wherein performing the traffic behavior analysis comprises:
    providing perception data received from a computer vision system in the autonomous vehicle to a machine learning model, the machine learning model configured to output a classification of traffic behaviors captured in the perception data as indicative of or not indicative of an approaching emergency vehicle.

18. The autonomous vehicle of claim 13, wherein the plurality of types of analysis comprise processing a vehicle-to-vehicle message received from another vehicle to determine if the vehicle-to-vehicle message contains an indication that an emergency vehicle is approaching the autonomous vehicle.

19. The autonomous vehicle of claim 13, wherein processing the generated predictions to generate the determination comprises:
    determining the emergency vehicle is proximate to the autonomous vehicle if a specified number of the types of analysis generated a prediction indicating an emergency vehicle is likely to be proximate to the autonomous vehicle.

20. The autonomous vehicle of claim 13, wherein processing the generated predictions to generate the determination comprises:
    determining the emergency vehicle is proximate to the autonomous vehicle if:
        a first type of analysis generated a first prediction indicating a likely proximity of the emergency vehicle; and
        a second type of analysis generated a second prediction indicating a likely proximity of the emergency vehicle.

21. The autonomous vehicle of claim 13, wherein processing the generated predictions to generate the determination comprises:
    applying a weighting function to the predictions generated by each of the plurality of types of analysis.

* * * * *